US008111865B2

(12) United States Patent
Lau

(10) Patent No.: US 8,111,865 B2
(45) Date of Patent: Feb. 7, 2012

(54) FLAT PANEL SPEAKER MOUNTING SYSTEM

(76) Inventor: Ka Wai Lau, Brooklyn, NY (US)

(*) Notice: Subject to any disclaimer, the term of this patent is extended or adjusted under 35 U.S.C. 154(b) by 1281 days.

(21) Appl. No.: 11/810,096

(22) Filed: Jun. 5, 2007

(65) Prior Publication Data

US 2008/0304693 A1 Dec. 11, 2008

(51) Int. Cl.
*H04N 5/60* (2006.01)

(52) U.S. Cl. .................... 381/388; 381/386

(58) Field of Classification Search .................. 381/388, 381/386

See application file for complete search history.

(56) References Cited

U.S. PATENT DOCUMENTS

| | | | | |
|---|---|---|---|---|
| 5,190,258 | A | 3/1993 | Yu | |
| 5,639,060 | A | 6/1997 | Spoonts et al. | |
| 5,852,545 | A | 12/1998 | Pan-Ratzlaf | |
| 6,311,946 | B1 | 11/2001 | Hoffman | |
| 6,480,613 | B1 * | 11/2002 | Choi | 381/386 |
| 6,527,237 | B2 | 3/2003 | Harary et al. | |
| 6,721,434 | B2 | 4/2004 | Polk et al. | |
| 6,997,525 | B2 * | 2/2006 | Gillengerten | 312/7.2 |

* cited by examiner

*Primary Examiner* — Roy Potter
(74) *Attorney, Agent, or Firm* — Richard L. Strauss, Esq.

(57) ABSTRACT

An apparatus for mounting two speakers to a flat panel display device is disclosed wherein the device, utilizing standardized mounting plates provided in such flat panel display devices, enables the mounting of two speakers while providing the ability to change speaker position in regards to six different position parameters. The apparatus may be utilized in conjunction with flat panel mounting devices, such as pedestal, wall or ceiling mounts, or utilized independently thereof. More specifically, the device further provides independent adjustment of the position of each speaker mounted thereby in regard to height, fore/aft and depth position, as well as rotation about an X, Y and Z axis. The device enables one to make changes in—regard to the position of a speaker—or other peripheral devices mounted thereon—relative to one or more of the aforementioned movements without altering other aspects of speaker position, if desired.

17 Claims, 9 Drawing Sheets

FLAT PANEL SPEAKER MOUNTING SYSTEM

TECHNICAL FIELD

The apparatus disclosed herein relates most closely to the technical field of speaker mounting devices. More specifically, the present apparatus relates to the field of devices utilized for mounting speakers—as well as other peripheral devices—to any type or form of flat panel display devices such as, for example, LCD monitors and televisions.

BACKGROUND OF THE ART

The term "flat panel display device" refers to an electronic display in which a large orthogonal array of display elements, such as liquid-crystal (e.g., LCD) or electro luminescent (e.g., plasma) elements, form a flat screen. The term "flat-panel display" is somewhat deceptive in that it is the thinness of the display that is the paramount characteristic. In the past, both television sets and computer monitors commonly utilized cathode-ray tubes. This technology can never be very thin (relative to flat panel display devices) in that cathode ray tubes generate light via the process of cathodoluminescence. In this process, a high-energy electron beam is scanned across a screen covered with an inorganic phosphor. Substantial tube depth is necessary to allow the electron beam to be magnetically or electrostatically scanned across the entire screen.

Flat panel monitors and televisions, including LCD and plasma display units, have become increasingly popular. Among other advantages related to flat screen technology, LCD and plasma displays are packaged in units having greatly reduced weight and housing depth (as opposed to earlier CRT display devices). Reduced weight and depth dimensions enable placement and use of flat panel display devices in rooms where limited space would obviate the use of conventional CRT technology.

The aforementioned reduced weight and depth of flat panel display devices has enabled such monitors and televisions to be mounted, via wall mount systems in convenient areas of a room. Many such wall mounting systems are now available to suit a myriad of mounting needs. In addition to wall mounting, LCD and plasma flat panel monitors and televisions may also be mounted upon what is best described as a pedestal mount. Such mounting systems enable the flat panel to be supported by a table or other flat surface located beneath the display.

In order to facilitate the production of various wall, ceiling and pedestal type mounts for flat screen displays, manufacturers of flat panel display devices have subscribed to a mounting configuration convention wherein a receiving plate, especially configured and adapted for receipt of mounting bolts is located on the back panel of such devices. The diameter of such mounting holes, as well as the location and distance between such holes is set forth in a standard known as the VESA standard.

A majority of flat panel monitors and televisions are now compliant with the VESA standard. The VESA standard calls for an industry mounting interface standard. More specifically, the VESA standard requires a specific hole pattern on the back of the monitor, screen or display. This standardized hole pattern enables wall, desktop or ceiling mounts having a corresponding hole pattern, to properly align with and be affixed to VESA compliant flat screen monitors and televisions. The VESA standard mounting hole patterns that are presently utilized may be summarized as follows: For smaller and medium flat panels, LCD monitors and television displays being from 12" to 22.9" diagonal, and falling in a weight range up to 30.8 lbs (14 kg), the hole pattern is: 75 mm×75 mm or 100 mm×100 mm (2.95"×2.95" or 3.94"×3.94"). Larger monitors with viewing screen from 23" to 30.9" diagonally, and a weight range up to 50 lbs: utilized a VESA standard of 200 mm×100 mm and 200 mm×200 mm. In regard to LCD and plasma displays having a diagonal measurement of from 31" to 90", and a weight not greater than 250 lbs, various hole patterns—all having 200 mm increments—are utilized such as, for example: 400 mm×200 mm, or 600 mm×400 mm, or 800 mm×400 mm The term "VESA" refers to "Video Electronics Standards Association" which is an international non-profit corporation. The corporation promotes and develops timely, relevant, open standards for the display and display interface industry, ensuring interoperability and encouraging innovation and market growth. The standards provided by VESA provide specific guidelines of the mounting hole pattern placement—as described above—screw size, and guidelines for the mounting pad or mounting apparatus to be utilized by equipment manufacturers based on a the size of the screen and monitor's weight.

Flat screen display devices are becoming the major display format for viewing television, recorded movies and video gaming. Although many flat panel monitors and televisions now include built-in speakers, such often provide sub-optimal sound production. However, the majority of such devices include "audio out" terminals to which external speakers may be attached. Utilizing external speakers with flat panel displays provides two major advantages in regard to built in sound systems. Firstly, higher quality speakers may be utilized which produce better sound and expanded frequency range. Secondly, external speakers may be positioned, in regard to the display, so as to optimize stereo separation while also producing sound which seems to be coming directly from the source depicted upon the screen (rather than producing sound which seems to come, for example, from below the action).

Mounting systems have been produced for affixing external speakers to flat panel televisions and monitors. However, such mounting systems have been limited in providing limited adjustment as to the position of the speaker in relation to the display. Also, heretofore, no speaker mounting system has been disclosed which easily and securely mounts to the majority of flat panel televisions and monitors. It would be highly advantageous if a speaker mounting apparatus, especially adapted for mounting speakers to a flat panel display would be provided wherein the apparatus enables adjustment of external speaker position in regard to six parameters including: speaker separation, speaker height, speaker depth, upward/downward speaker angulation and inboard/outboard speaker angulation and left/right tilt (canting). It would be further advantageous if such an apparatus included a means to affix the device to a flat panel television or monitor utilizing the VESA standard mounting holes provided in the majority of such display devices.

SUMMARY OF THE INVENTION

Now, in accordance with the present invention, a speaker mounting apparatus is disclosed, especially adapted and configured to enable mounting of at least two speakers thereupon and to be affixed to a flat panel display device by means of standardized mounting holes located within the rear portion of such devices with or without simultaneous use of a flat panel mounting bracket. The speaker mounting apparatus of the present invention enables independent adjustment of the positioning of the at least two speakers, in relation to the flat panel display in regard to six different position parameters:

1. lateral distance from the display (e.g. from the right and left sides of the panel) as well as physical separation between the at least two speakers;

2. height of each speaker, 3. depth of each speaker, (which may also be described as fore/aft position);

4. upward/downward tilt, (which may also be described as pitch or rotation about the X axis—the axis of rotation of such movement being located at the below-described joint providing such tilt—;

5. inboard/outboard speaker tilt, which may also be described as yaw or rotation about a Y axis—the axis of rotation of such movement being located at the below-described joint providing such tilt—;

6. right/left canting, which may also be described as roll or rotation about a Z axis—the axis of rotation of such movement being located at the below-described joint providing such canting—.

The first preferred embodiment of the present invention is comprised of at least one mounting bracket, at least one horizontal receiving arm, two extension tubes, two pivot arms, two pivot brackets, two sway arms, two intermediate arms, two tertiary arms, two platform arms and two speaker platforms. The at least one mounting bracket may be configured, for example, so as to engage mounting bolt receiving holes within the flat panel display's rear surface on both the right and left sides thereof. In such instances, rather than utilizing two independent mounting brackets—to engage one or more right an left receiving holes, a single mounting bracket may serve to engage both said right and left holes. The components of the first preferred embodiment include joints therebetween, as discussed immediately below, that enable the aforementioned speaker position adjustments. In regard to the term "relative height", such term refers to the height of a speaker relative the flat panel display device upon which it is mounted. Thus, an increase in relative height of a speaker mounted upon the device of the present invention would indicate the speakers position moving towards, to, and/or beyond the top or upper extent of the flat panel display when mounted in the usual manner they are mounted to view the display. The term "relative depth" refers to the depth of a speaker mounted via the device of the present invention relative to what may be described as the planar surface that comprises (and from which the name flat panel is derived). For example, an increasing depth position of the speaker would mean the speaker position is moving from, for example, a neutral position parallel to the front planar surface of the display device to a position towards the rear of the device. A decrease in depth would mean the speaker is moving forward, towards a direction in front of the front planar surface of the panel.

The aforementioned adjustments to speaker position are achieved utilizing the various pivoting, extending and rotating joints incorporated within the device of the present invention, described in more detail, below. The device of the present invention comprises, in a preferred embodiment thereof, a horizontal receiving arm, having a length, which is mounted, in a horizontal relation, to the back of a flat screen display device via bracket(s) that, in turn, are mounted to the panel utilizing bolts which engage VESA mounting holes incorporated into such flat panel devices and corresponding holes in the bracket(s). The horizontal receiving arm, which is mounted, via the aforementioned bracket(s), to the rear of a flat panel device, includes a channel within which receives two extension arms—one extension arm fitting within and extending from a left and one from a right terminus of the receiving arm. The extension arms are thus slideably mounted within, or in certain alternate preferred embodiments, coaxially about the receiving arms. The extension and retraction of the extension arms away from and back into the receiving arms enables one, as described in greater detail below, to increase or decrease the distance between speakers mounted upon the device. The extension arms each receive, at a distal terminus thereof, a pivot arm which forms, in conjunction with a pivot bracket, a pivot arm/pivot bracket joint. This joint enables adjustment of speaker position in regard to left and right canting of the speaker or what also may be described as rotation about the Z axis or, alternatively, a change in roll position. The pivot bracket, in turn, forms a joint—capable of a pivoting motion—with a sway arm to form a pivot bracket/sway arm joint. This joint enables the device of the present invention to adjustment of speaker position in regard to inboard/outboard speaker tilt (which may also be described as yaw or rotation about a Y axis).

The sway arm is affixed, via a pivoting joint, to an intermediate arm to form a sway arm/intermediate arm joint. This joint provides a rotational or pivoting motion which enables one to adjust speaker position in regard to upward/downward tilt (which may also be described as pitch or rotation about the X axis). Independent motion of this joint (motion of this joint while all other pivoting/rotating joints remain in place) will also effect the relative height, depth and upward/downward tilt of speakers mounted upon the device.

The intermediate arm is joined, via a pivoting joint to a tertiary arm. This joint provides a rotational or pivoting motion which also enables one to adjust speaker position in regard to upward/downward tilt (which may also be described as pitch or rotation about the X axis). Independent motion of this joint will also effect the relative height, depth and upward/downward tilt of speakers mounted upon the device. Adjustment of this joint, in combination with adjustment of the aforementioned sway arm/intermediate arm joint enables one to alter the height of a speaker mounted upon the device without altering upward/downward tilt, or, as it may also be described, enables one to select a desired height independently of a desired upward/downward speaker tilt.

The tertiary arm is joined to a platform arm, (upon which a speaker platform is mounted) via an additional pivot joint—the tertiary arm/platform arm joint. Independent motion of this joint adjusts the upward/downward tilt of a speaker and also effect the relative height and depth of speakers mounted upon the device, as described in more detail, below. Adjustment of this joint, in combination with adjustment of the aforementioned intermediate arm/tertiary arm joint and intermediate arm/sway arm joint enables one to independently select and obtain a desired height, upward/downward tilt and/or relative depth of a speaker. That is to say, one may, by manipulating all three joints, adjust any one or more of the aforementioned height, upward/downward and depth parameters while maintaining the other parameters as desired.

A speaker platform is mounted upon the aforementioned platform arm so as to provide a mounting surface for a speaker. A speaker may be mounted upon the platform via screw, bolt, adhesive putty or any other suitable fastener or material.

The speaker mounting apparatus of the present invention enables full control and adjustment of speaker location for the following purposes. In regard to stereo separation—an effect generated by a right and left channel sound source which, optimally, reproduces sound which appears to originate from different portions of the screen, the present apparatus enables a user to adjust the physical separation of the speakers—the distance of a left speaker from the left side of the display and the distance of a right speaker from the right side of the display—in order to produce optimal stereo sound reproduction.

The speaker mounting apparatus of the present invention also enables adjustment of speaker position in regard to the height at which each speaker is positioned. Such adjustment enables a user to place each speaker at an optimal height in regard to the displayed picture position. Thus, the apparatus of the present invention allows one to mount each speaker at an optimal height in regard to the screen configuration and size of the flat panel device to which it is mounted. Thus, speakers may be placed so that at a height corresponding to the middle of the full height of a particular screen. For example, if a flat panel screen includes a display having a height of 10 inches, and speakers to be mounted thereupon are 5 inches in height, then the mounting apparatus can be adjusted so that each speaker is aligned so that the midpoint of each speaker's height (2.5 inches) is horizontally aligned with the midpoint of the display height (5.0 inches) Speakers positioned in this manner will project sound that appears to originate at the same height as the display rather than above or below the image.

The speaker mounting apparatus of the present invention also enable adjustment of each speaker in regard to inboard and outboard tilt/angulation. This positioning parameter may also be described as rotation about a Y axis or yaw position. Especially in regard to smaller display devices having screen displays of less than 17 inches, positioning of external speakers, in regard to inboard and outboard angulation, enables one to adjust sound projection in regard to the distance at which an individual is ordinarily positioned when listening to sound reproduction. In addition, the ability to tilt speakers inward (inboard) towards the panel, can effectively reduce echoes produced when sound bounces off objects, close to the display, and located to the right and/or left of the display.

The speaker mounting apparatus of the present invention also enable adjustment of each speaker in regard to upward and downward speaker tilt which may also be described as speaker pitch or rotation about an X axis. Especially in regard to wall mounted flat panels, which may be mounted at various heights due to the physical layout of a room in which they are mounted, the ability to adjust speakers so as to project sound—either upward or downward—towards a customary viewing position facilitates superior sound projection and clarity. Thus, the sound performance of a flat panel display mounted at a relatively high position—which does not enable screen tilt—can be improved by adjusting the speaker mounting apparatus to project sound downward. Conversely, sound from a relatively low mounted display device may be improved by adjusting the apparatus to tilt the speakers mounted thereupon upward.

The speaker mounting apparatus of the present invention also enables adjustment of each speaker in regard to right/left canting—which may also be described as speaker roll or rotation about a Z axis. Depending upon the acoustic situation of a given listening/viewing environment, the ability to make changes in speaker canting may help to optimize speaker sound.

The speaker mounting apparatus of the present invention also enable adjustment of each speaker in regard to depth position of each speaker relative to the plane defined by the viewing surface of the flat panel display device. Therefore, each speaker may positioned so that the face of each speaker—which is also, commonly, a flat planar surface—lies even with, behind or in front of the device. Such adjustability, afforded by the apparatus of the present invention, enable one to further optimize sound reproduction, realism and projection by locating each speaker, the source of such sound, at a position, relative to the display which produces a desired sound quality.

The speaker mounting apparatus of the present invention is especially configured and adapted to include flat panel mounting holes which align with and enable the apparatus to be affixed to flat panel display utilizing VESA mounting hole configurations and dimensions. Thus, the apparatus of the present invention may be mounted to such displays by means of threaded mounting holes provided in a plate locate in the back panel of such displays in accordance with the aforementioned VESA conventions and standards. The apparatus of the present invention, as described in much greater detail below, can be mounted to such displays via the VESA mounting holes without interfering with, and, in desired, in conjunction with wall, ceiling or pedestal type mounts also affixed to these same VESA mounting holes. Thus, the apparatus of the present invention provides a convenient and reliable means for affixation of the speaker mount to flat panel displays.

Figure 1:
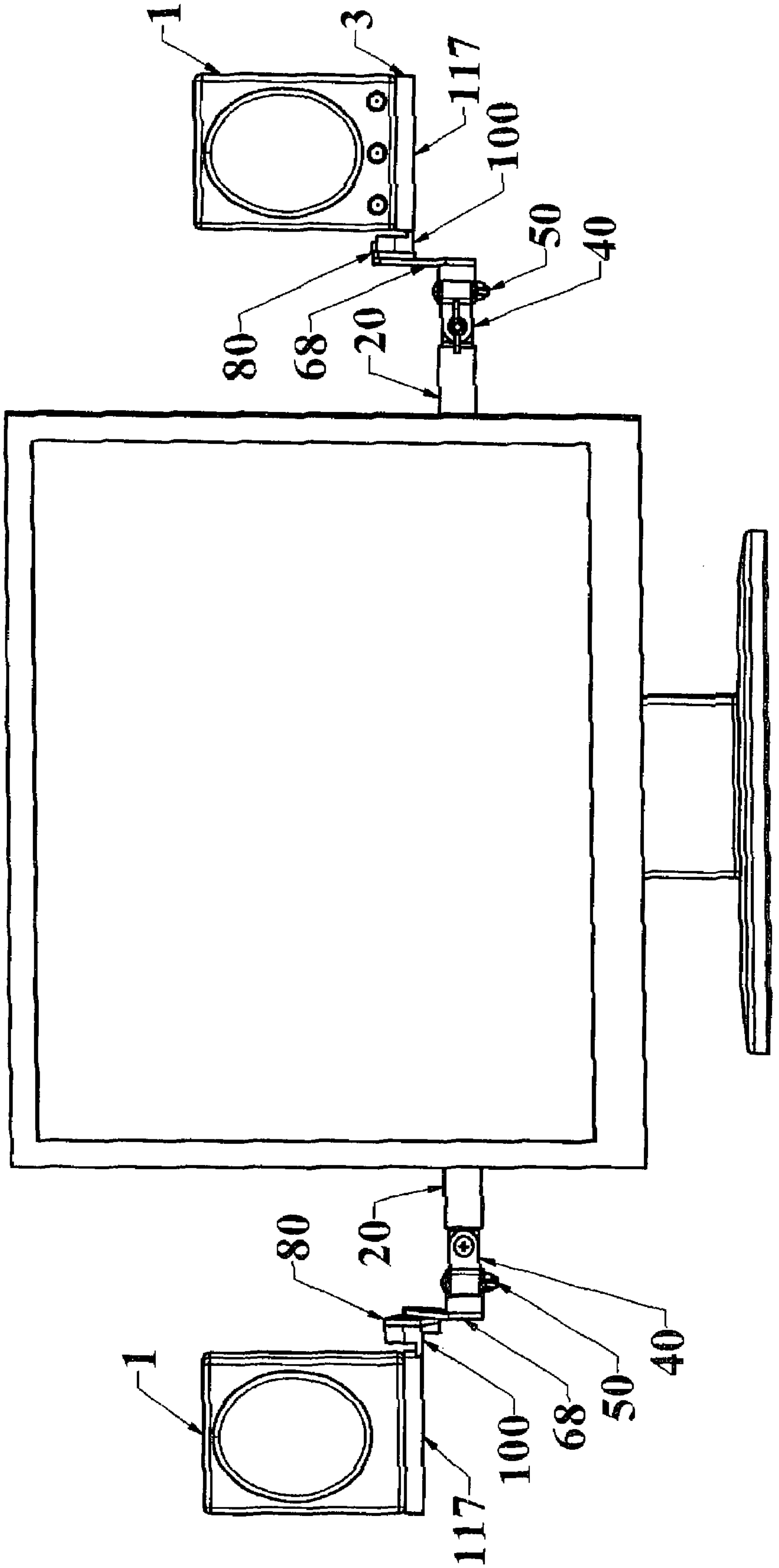
FIG. 1 is a front view of a preferred embodiment of the speaker mounting device of the present invention.
Figure 2:
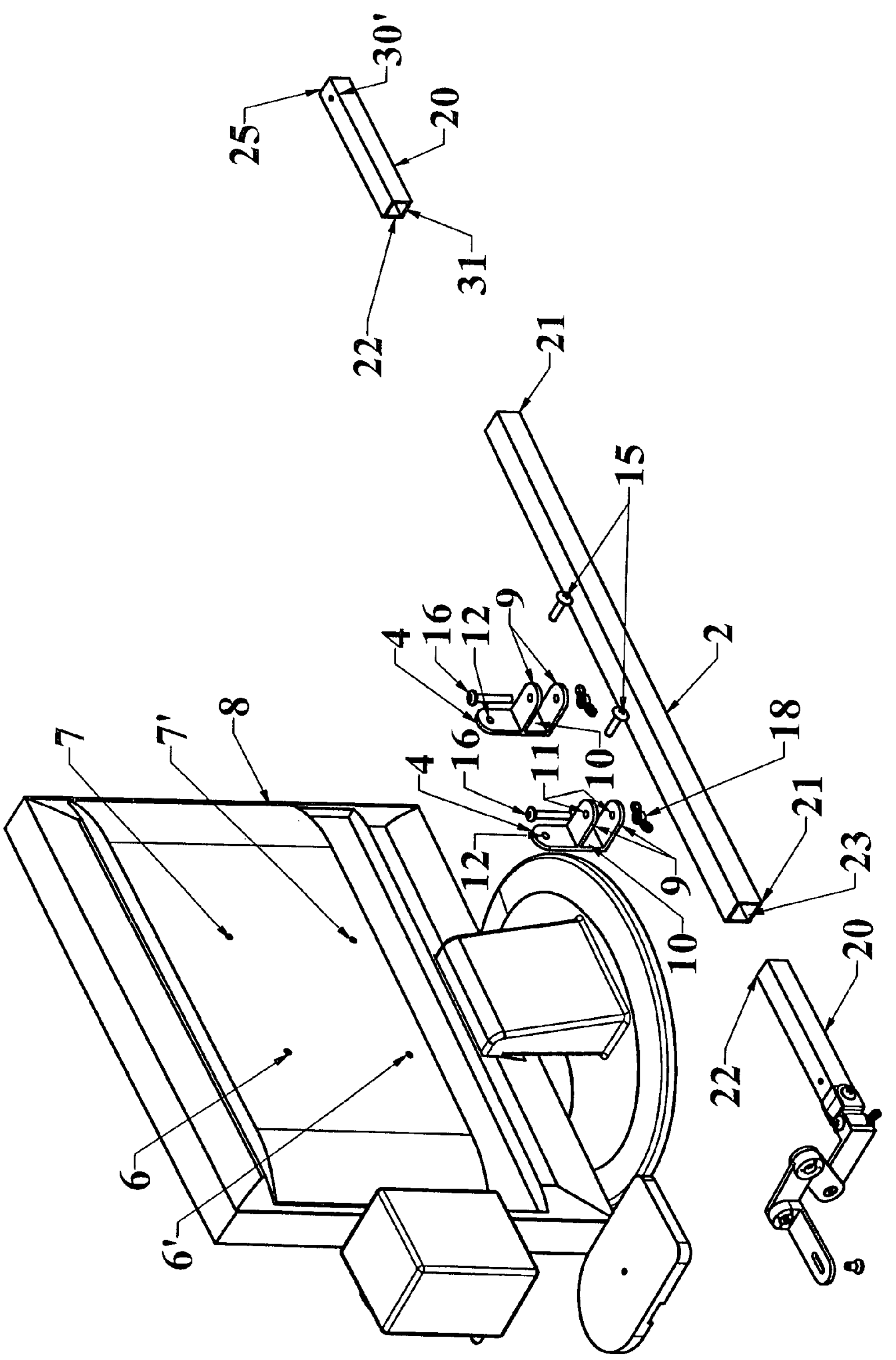
FIG. 2 is a left elevated view of the embodiment illustrated in FIG. 1.
Figure 3:
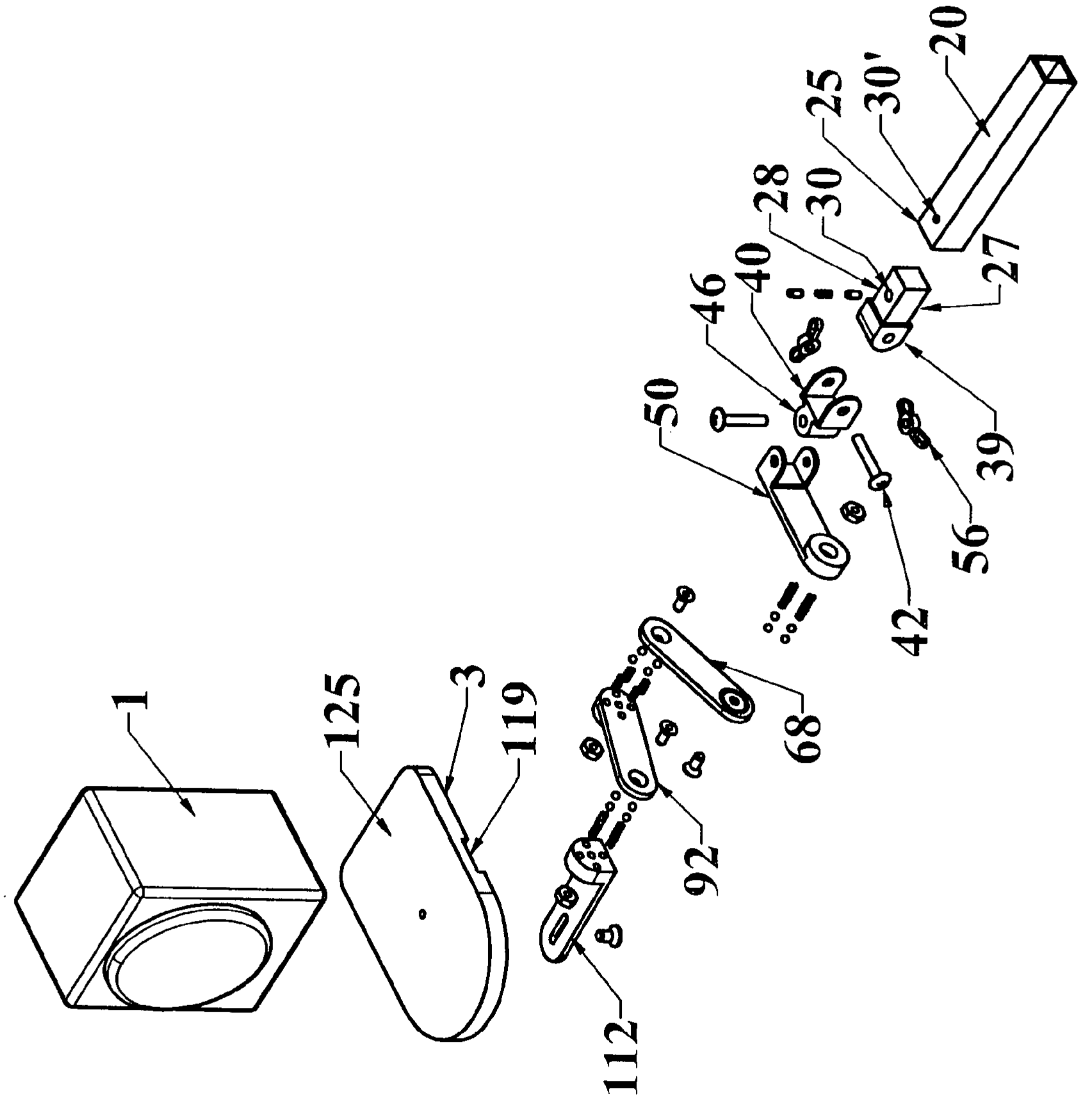
FIG. 3 is an isometric exploded view of a portion of the embodiment illustrated in FIG. 2.

FIG. **3*a* is a sectional view of the exploded view shown in FIG. 3**.

FIG. **3*b* is an additional sectional view of the exploded view illustrated in FIG. 3**.

Figure 3A:
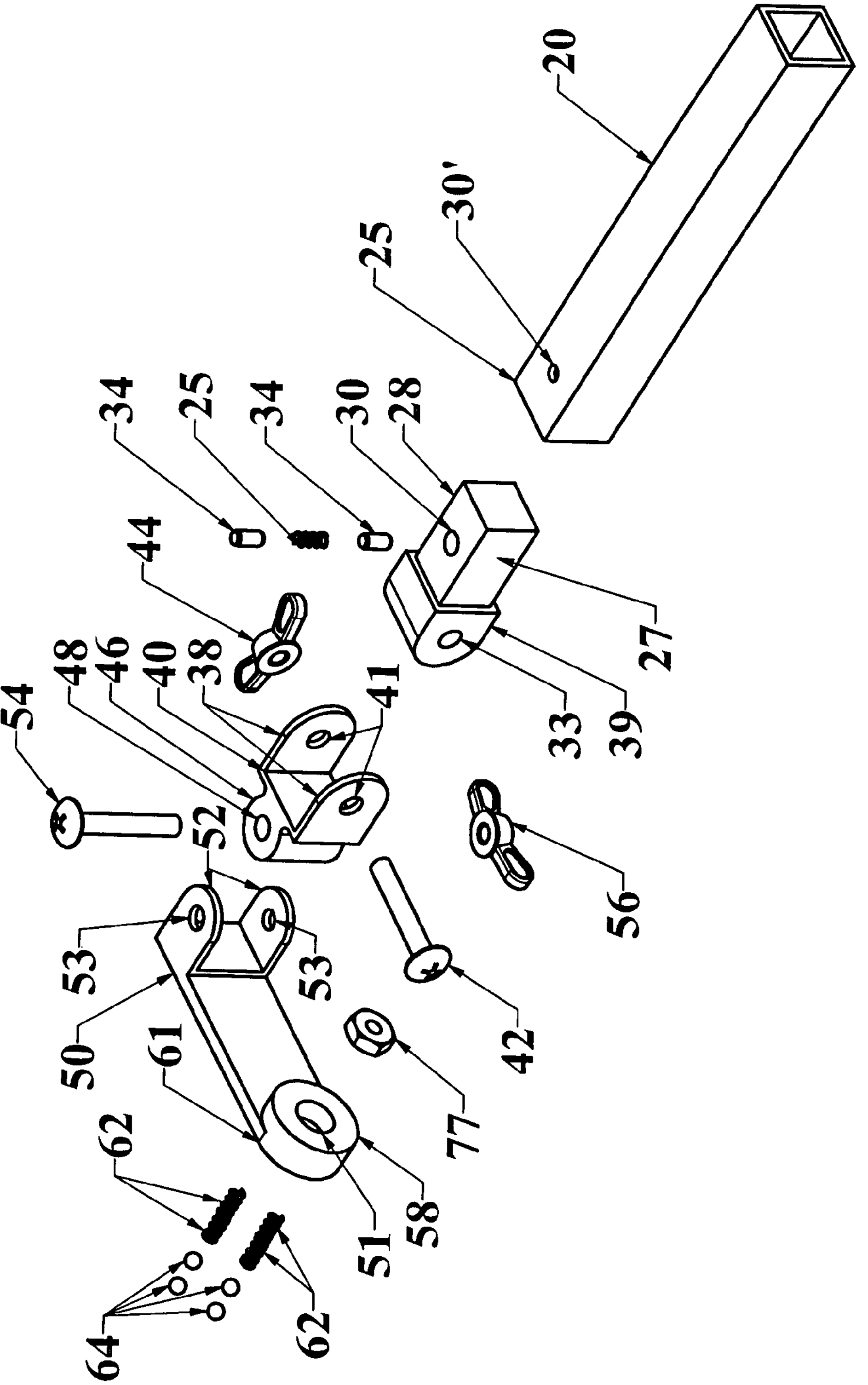
Figure 3B:
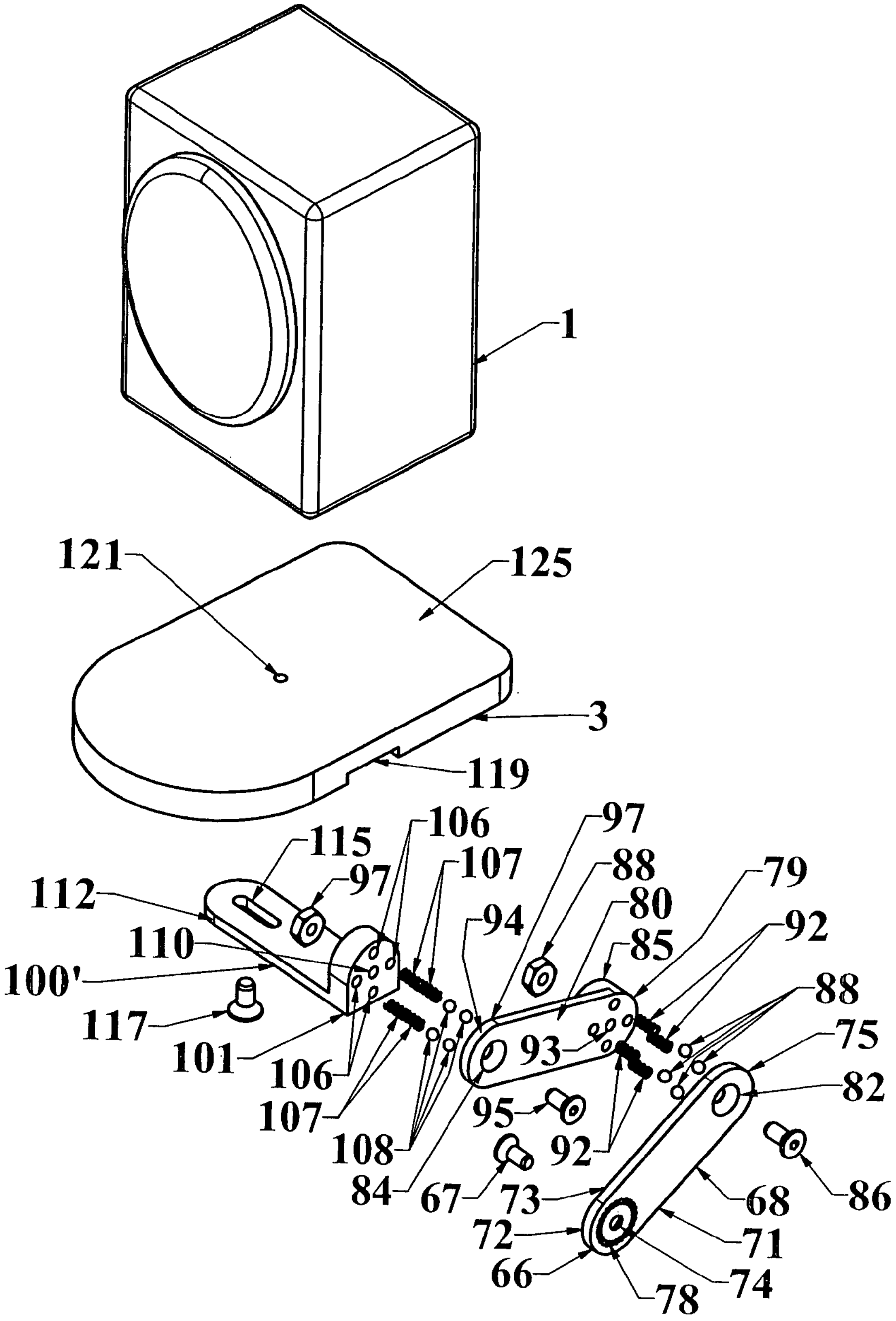

FIG. **3*c* is a detail view of the distal portion of intermediate arm 71 shown in FIGS. 3*a* and 3*b***.

Figure 4:
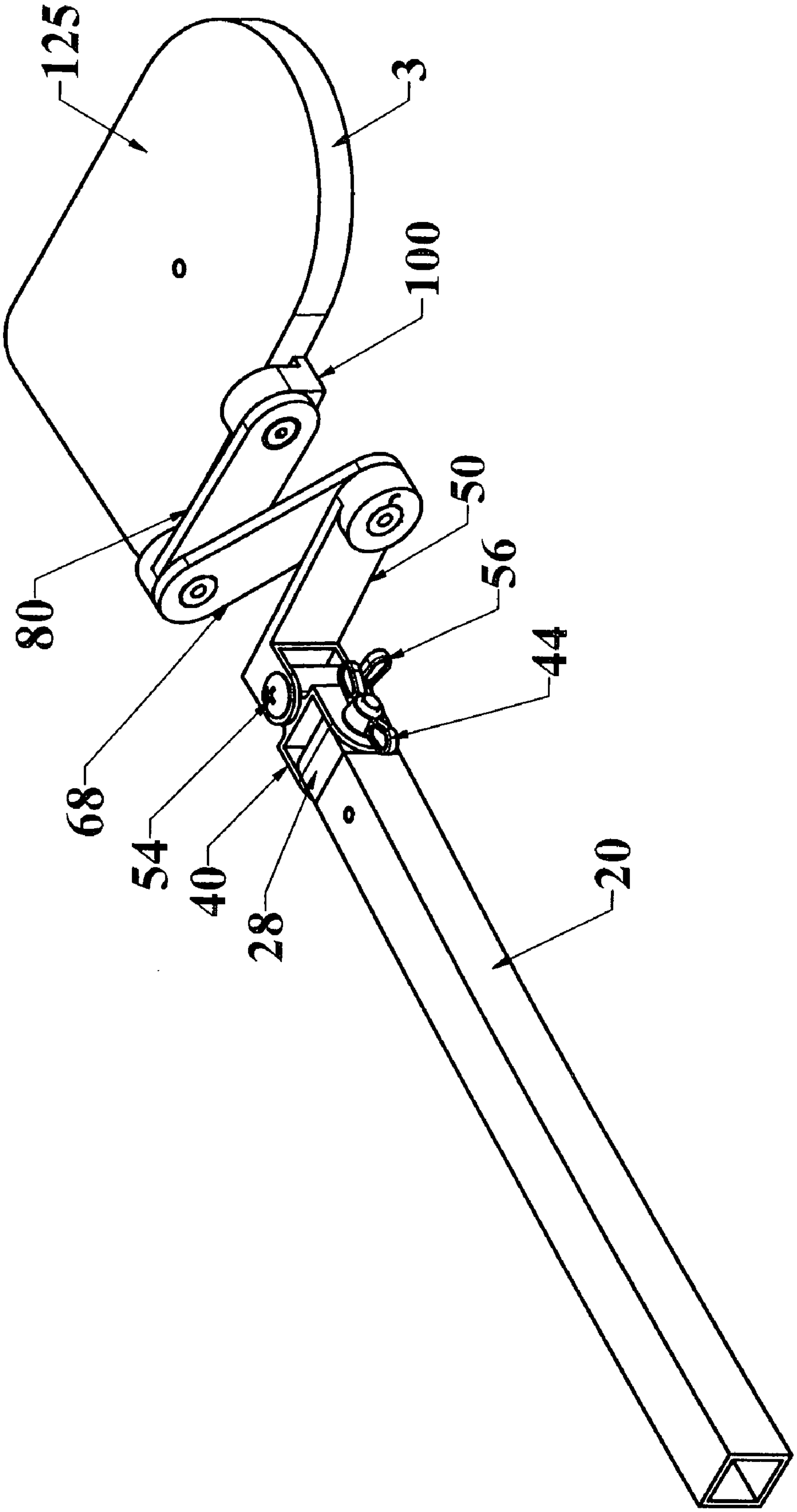

FIG. 4 is an additional section view of FIG. 3

Figure 5:
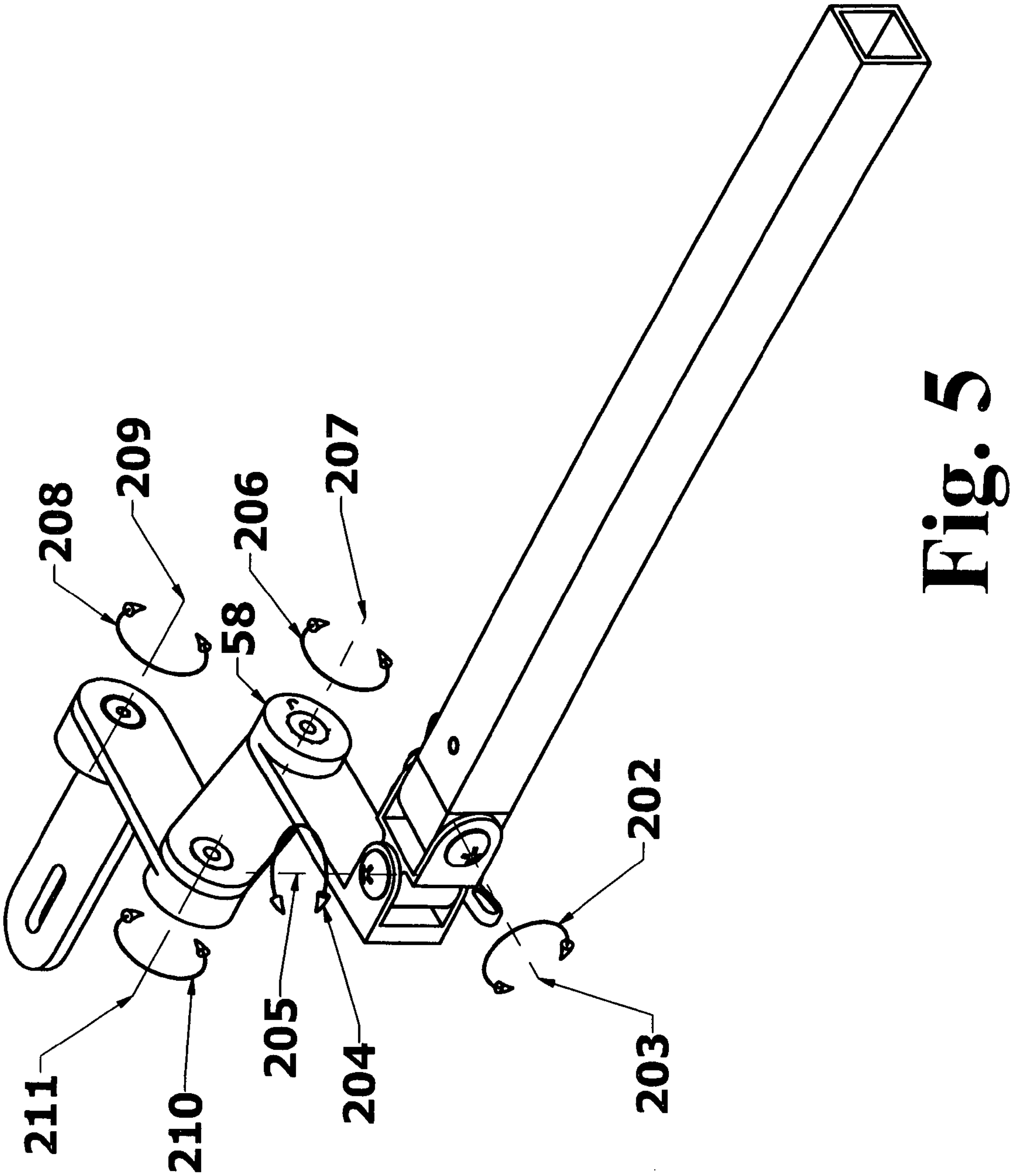

FIG. 5 is a section view of the device illustrated in FIG. 3.

Figure 6:
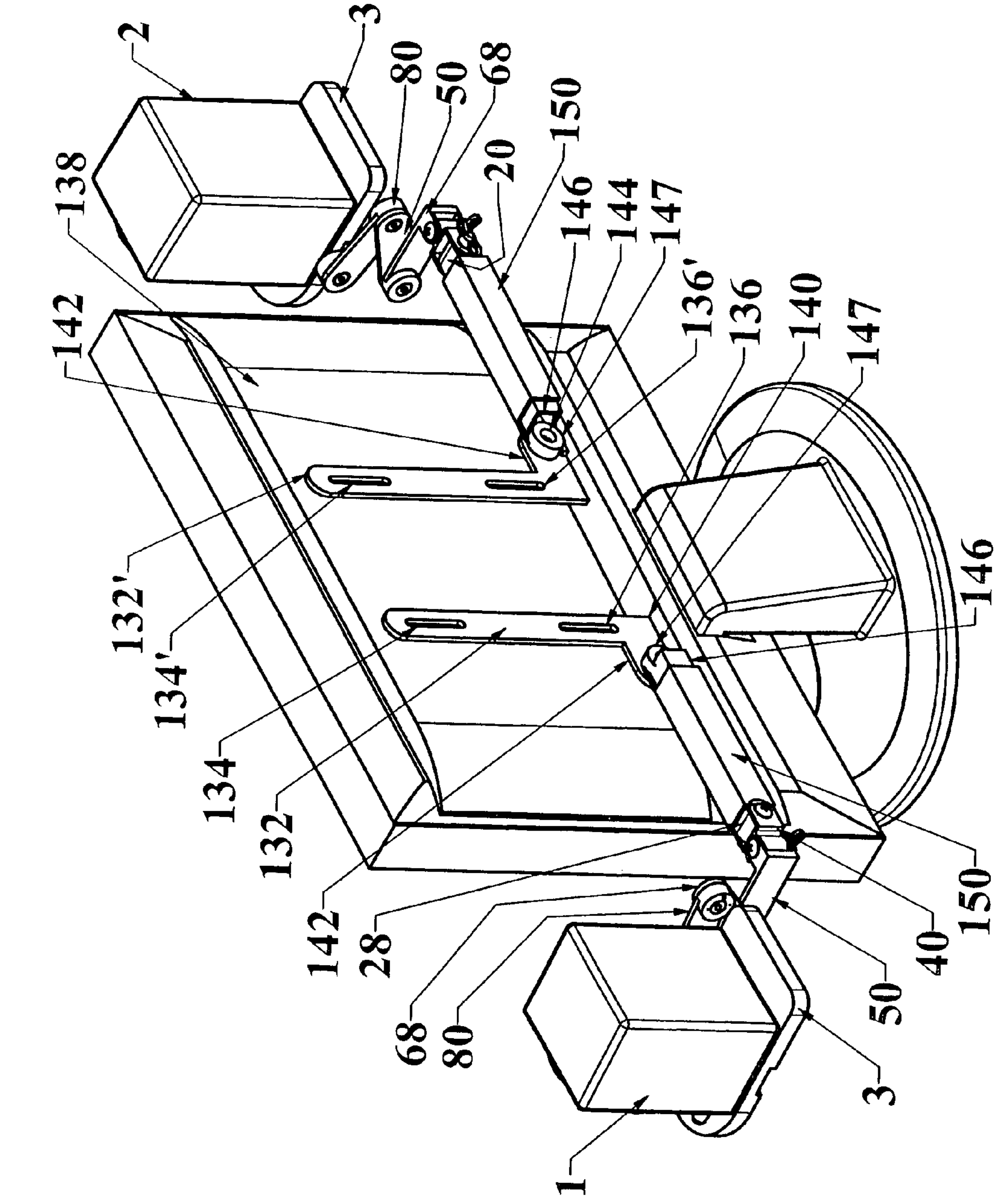

FIG. 6 is a rear isometric view of an alternate preferred embodiment of the present invention.

DETAILED DESCRIPTION

In a first preferred embodiment of the present invention, an apparatus for mounting at least two speakers to a flat panel display device is provided wherein said device may be affixed to a flat panel display utilizing standardized threaded mounting holes provided in said flat panel devices (also known as VESA compliant mounting holes) and wherein the apparatus enables adjustment of the position of each of said at least two speakers relative to the flat panel display in regard to speaker separation, speaker height, speaker depth; inward/outward tilt, upward/downward tilt and left/right cant. The first preferred embodiment of the present invention—as all embodiments thereof—may be utilized in conjunction, or independent of flat panel mounting devices such as, for example, pedestal, wall and ceiling mounts (as discussed above and below.)

The first preferred embodiment of the present invention, as illustrated in FIGS. 1-5, provides an apparatus for mounting at least two speakers to a flat panel display especially configured and adapted for use with flat panel display devices having view screen measurements of from about 12" to 22.9" diagonal, and falling in a weight range up to 30.8 lbs (14 kg). However, the first preferred embodiment may also be utilized with flat panel display devices of greater or lesser dimensions and weights. Due to the fact that the VESA hole pattern for such devices (75 mm×75 mm or 100 mm×100 mm) and fairly diminutive weight enables the use of a flat plate mounting adapter (as opposed to the two piece parallel arm mount described below in connection with larger displays), the first preferred embodiment of the present invention utilizes a single receiving arm 2, mounted via two "F" shaped mounting brackets 4 to at least two receiving holes 6, 6', 7 and 7' located in a mounting plate integrated into the back of a flat panel display monitor 8. The two "F" shaped mounting brackets include an upright mounting arm 10 within which at least one mounting bolt receiving bore 12 is located and two horizontal receiving arms 9. In certain preferred embodiments of the present invention, the upright mounting arm 10 of the "F" shaped bracket 4 has sufficient length to extend past two vertically aligned flat panel mounting holes (examples of which are 6/6' and 7/7') and provide sufficient length thereby to incorporate two receiving bores 12 thereupon which are spaced apart, one from another so as to align with the aforementioned vertically aligned flat panel mounting holes. If the apparatus of the first preferred embodiment of the present invention utilizes an "F" bracket having an upright mounting arm with a reduced length sufficient to enable engagement of one flat panel receiving hole only (usually a lower receiving hole) and the display unit itself is mounted via a wall mount, ceiling mount or pedestal mount apparatus, it is preferable to first align the selected display panel mounting bracket with the aforementioned receiving holes, and thereafter align an "F" shaped bracket—having one receiving bolt only—with a lower receiving hole (6' and 7)' on top (outboard) of the mounting bracket. This configuration, as opposed to placing the "F" shaped bracket underneath the panel mounting apparatus, enables the panel mounting bracket to lie flat against the rear mounting surface of the display device. In those embodiments of the present invention wherein an "F" shaped mounting bracket utilized to mount the receiving arm to the display device includes upright mounting arms having a length sufficient to incorporate two bolt receiving bores (configured to align with two flat panel mounting holes (e.g. 6 and 6')), it is preferable to mount the "F" shaped bracket between the wall, ceiling or pedestal mount and the back panel of the display device. Such a configuration allows the "F" shaped bracket to be more securely affixed to the flat panel mounting plate and lie flat against the back panel of the display device. In this configuration, the upright arms form a surface enabling the panel mounting apparatus to lie flat against the "F" shaped brackets. In either instance, a machine bolt 15 passing through the bolt receiving bore 12 of the "F" shaped bracket 4 (as well as the receiving hole of any flat panel device mount aligned with the mounting holes of the flat panel device) and thereafter threaded into a bolt receiving holes of the flat panel device (6, 6' 7 and 7') secures the "F" shaped bracket to the flat panel device (as well as securing any panel mounting device mounted to the device.

The "F" shaped brackets are advantageously constructed of a rigid and durable materials such as, for example, a metal material such as, for example, aluminum, an aluminum alloy or steel (and steel alloys). However, the "F" shaped brackets may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

Each of the two horizontal receiving arm arms 9 include vertically aligned bolt receiving bores 11. The distance between the two horizontal receiving arm arms is especially configured to enable capture therebetween of the receiving arm 2. In addition, the receiving bores 11 within the horizontal arms are located in such a position so that when the receiving arm is captured within the horizontal arm arms of the "F" shaped bracket, and bolt 16 is placed through the two receiving holes and affixed therein by means of wingnut 18, the receiving arm is held firmly in place.

The horizontal receiving arm is advantageously configured as a hollow arm having a square or rectangular cross section and two open termini 21. The receiving arm includes a channel 23 therewithin especially shaped and configured to slidably receive extension arms described in more detail, below. Utilizing such a cross sectional shape stabilizes the extension arms against rotation. The extension arm is configured to have the same cross sectional shape as the horizontal receiving but defines a more diminutive cross sectional area so as to allow the extension arm 20 to fit and slide within the channel 21 of the receiving arm, as discussed in more detail, below. The extension arm includes a proximal 22 and distal 25 termini which are open. The proximal end 22 of the extension arm is fitted and placed within one of the open termini 21 of the horizontal receiving arm. Each extension arm may be extended from or retracted back within the horizontal receiving arm. In this manner, the position of speakers, mounted upon the device platform, may be adjusted in regard to movement towards or away from the flat panel display device and, of course, each speaker from the other. Thus, for example, two speakers placed upon the platforms, may be drawn away from the display—in order to obtain greater physical as well as stereo separation—or moved closer towards each other and the display. Alternatively, the distance between each speaker and the panel may be independently adjusted in certain instances where such is necessary. For example, a physical obstruction may require one speaker to be closer to the display than the other. The movement provided by the movement of the extension arm within the horizontal receiving arm is, of course, movement which is parallel to the base of the flat surface of the flat screen display and also aligned with the receiving arm, which is, as its name implies, horizontally mounted to the display.

The horizontal receiving and extension arms are advantageously constructed of a rigid and durable materials such as, for example, a metal material such as, for example, aluminum, an aluminum alloy or steel (and steel alloys). However, these arms may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

A pivot arm 28 is especially configured and adapted for insertion within a channel 31 defined by the walls of the extension arm adjacent to the distal termini of said arm. The pivot arm is shaped and configured to include, at a proximal portion thereof, an insert section 27 which defines the same cross sectional shape as the extension arm (e.g. rectangular or square) but of a lesser outside dimension so as to enable the insert section of the pivot arm to be inserted within the channel located adjacent to the distal portion 25 of the extension arm. The distal portion of the pivot arm is shaped as a curved portion 39 having an outside radius of about 180 degrees. A pivot bolt receiving hole 33 located at the central axis of said radius. The curved distal portion of the pivot arm enables, as described in greater detail below, adjustment of the position of a speaker mounted upon the platform of said apparatus in regard to deviation from vertical alignment, or as it may also be described, rotation about an "Z" axis or change in roll position (adjustment in left and right cant.)

At the proximal insert portion of the pivot arm, a lock pin bore 30 is provided, which is especially positioned to align with a lock pin bore 30' located proximal to the distal termini of the extension arms. The aforementioned bores align when the proximal insert portion of the pivot arm is fully inserted within the distal portion of the extension arm. Two lock pins 34 extend outward from bore 30 by spring 25 and effectively align with bore 30' (located on both the superior and inferior surface of the extension arm, adjacent the distal terminus thereof when said alignment is accomplished. The extension of the lock pins effectively affixes the pivot arm within the channel defined by the extension arm adjacent to the distal termini thereof.

As discussed above, a pivot bolt receiving bore 33 is provided at the central axis of the curved distal portion 39 of the pivot arm. A pivot bracket 40 is provided for articulation with the pivot arm. The pivot bracket includes, at a proximal portion thereof, two parallel extension tabs 38 having a distance therebetween especially configured and adapted for receipt of the curved portion of the curved portion of the pivot arm therebetween. The distal portion of the pivot bracket defines a vertically disposed barrel shaped section 46 defining a radial curve of about 270 degrees. Located at a central axis of the radial curve is a sway arm receiving bolt bore 48 which enables, as described in greater detail below, pivotal affixation (enabling rotation) of the pivot bracket to a sway arm 50 positioned distal thereto.

Each of the parallel extension tabs 38 of the pivot bracket 40 includes a pivot bolt receiving hole 41 located proximal to the termini thereof which align,—when the curved portion of the pivot arm is placed between the confines of the two extension tabs—and aligned with the pivot bolt receiving hole 33 of the pivot arm—. A pivot bolt 42 inserted through said pivot bolt receiving holes of the pivot bracket and arm—and retained in position by a wing nut 44—effectively affixes the pivot arm to the pivot bracket while enabling pivotal movement therebetween.

As described above and below, the pivotal (rotational) movement of the pivot arm in relation to the pivot bracket—forming the pivot arm/pivot bracket joint—enables left/right canting of a speaker 1 mounted upon the below described platform 3 in regard to a flat screen display device upon which the apparatus is mounted. Or, as the movement may also be described, the pivot arm/pivot bracket joint enables rotation of the platform, and a speaker mounted thereupon, about the "Z" axis or a change in roll position. The pivot arm/pivot bracket movement 202 is illustrated in FIG. 6. The Z axis 203 passing through the joint and aligned with bolt 42 form the axis of rotation and would like roughly parallel with a Z axis perpendicular to and passing through the center of the flat panel display.

As utilized throughout this specification and within the claims, movement of speaker platform and, of course, a speaker mounted thereupon, is described utilizing the Cartesian coordinate system which utilizes an "X", "Y" and "Z" axis to locate any point in space as well as to describe movement along, for example, an arc. The planar surface formed by the front of a flat screen display panel is utilized as a reference plane so as to form a hypothetical origin point, located on the outer surface of the display screen, and at the midpoint of the height and width thereof. This point is referenced herein as the origin of the X, Y and Z axis. The X axis may therefore be described as a line running horizontally along the panel, passing through the origin at a center point of the panel and running along the panel at what may be described as mid-panel height, effectively dividing the panel in an equal upper and lower portion. The Y axis may be described as a hypothetical line running vertically, through the origin, effectively dividing the panel in a equal right and left section. The Z axis may be described as a hypothetical line running perpendicular to the planar surface of the flat screen display panel and, of course, also passing through the origin point located in the middle of the panel. Of course the origin of speaker movement does not overlies and correspond to the display screen but rather originates in the center of the joint producing the described movement. Thus, while speaker movements (especially rotation about the X, Y, and Z axis) are best described with reference to the flat monitor screen, the arc of all such rotational movements originate in the actual joint enabling such movement. These joint movements, and the axis of rotation thereof, are shown in FIG. 6.

The sway arm 50 includes a proximal portion having two parallel extension tabs 52 extending therefrom. The distal portion of each of the said extension tabs includes, at a distal portion thereof, a curved portion defining a radius of about 180 degrees. The distance between the two parallel extension tabs is especially configured and adapted for close receipt of the barrel shaped portion 46 of the pivot bracket. Each of the parallel extension tabs of the sway arm includes, at a central portion thereof corresponding to the axis of said radius, a sway arm bolt receiving hole 53. This receiving hole is especially positioned and configured for alignment with the sway arm bolt receiving hole 48 located centrally within the barrel shaped portion of the pivot bracket—when the barrel shaped portion it is captured within the area defined by the extension tabs of the sway arms—. A sway arm bolt 54 passing through the each of the aforementioned sway arm bolt receiving holes is affixed in placed via wingnut 56 so as pivotally affix the pivot bracket to the extension tab. The pivotal motion provided by the aforementioned movement 204 of the sway arm/pivot bracket joint enables the position of a speaker, mounted upon the platform of the device of the present invention, to be tilted inboard and outboard relative to a flat screen display upon which the device is mounted. Movement of this joint may also be described as rotation of speaker position relative to the "Y" axis 205 of the sway arm/pivot bracket joint or changes in yaw angle. (See FIG. 5)

The sway arm 50 includes, at a distal portion thereof, a curved disc section 58 having a radial curve of about 360 degrees. At the radial axis of the radial curve, a retaining bolt bore 51 is formed. An outwardly disposed portion 61 (outer face) of the curved section of the distal portion of the sway arm includes four position locating ball receiving bores. Each such receiving bores contains therewithin, an extension spring 62 and a positioning ball 64 which is biased outward from said receiving bore by said spring.

The outer face of the sway arm is aligned with and affixed to a proximal portion 66 of intermediate arm 68. The proximal portion of the intermediate arm is formed as a radial curve 72 having an inside face 71 and an outside face. At the radial axis of the radial curve of the proximal end of the intermediate arm, a retaining bolt bore 74 is formed to receive retaining bolt 67 which passes through both bore 74 and the retaining bolt bore 51 formed on the distal portion of the sway arm 50. Upon threading of nut 77 thereupon—to effectively affix the sway arm to the intermediate arm, a sway arm/intermediate arm joint is formed is such a manner as to allow said joint to rotate 206 (pivot) as described below an illustrated in FIG. 6.

Figure 3C:
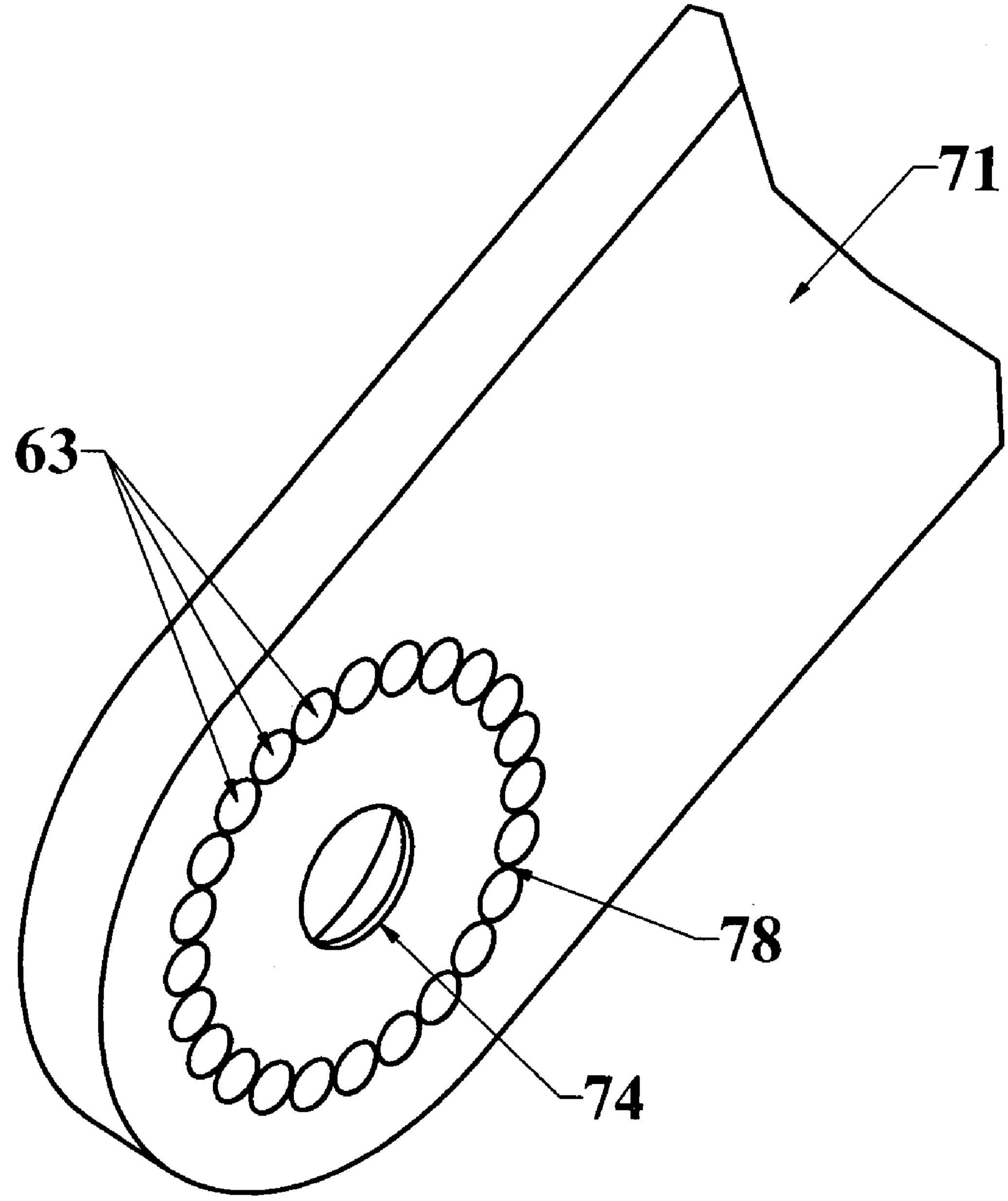

Circumferentially disposed about the retaining bolt bore 74—on the inner face 71 of the proximal terminus of the intermediate arm—, (shown in detail in FIG. 3*c*) a positioning groove 78 is formed with the curved disc section. The positioning groove is configured as a groove formed of circular depressions having substantially the same diameter as the positioning balls and having a depth less than one half the diameter of the positioning balls. The positioning groove is formed and located upon the inner face of the proximal end of the intermediate arm is such a manner so that, when the intermediate arm and sway arm are affixed together via the aforementioned bolt and wingnut, as described immediately above—a pivot arm/intermediate arm joint is formed wherein:

1. The intermediate arm is capable of pivotal movement relative to the sway arm; and 2. The positioning balls 64, located within the retaining bores of the sway arm provide positive pivotal "stops" as the balls, urged outward by the extension springs 62 enter into and engage the circular depressions 63 comprising the positioning groove.

Thus, the intermediate arm/sway arm joint provides pivotal movement wherein the circular depressions comprising the positioning groove 78 acts to provide positive detents for accurate positioning. The pivoting movement of the sway arm relative to the intermediate arm—in the absence of movement of any of the aforementioned, or below described joints—enables the position of a speaker 1 affixed to platform 3 to be adjusted in regard to an upward/downward arc which may also be described as adjustment to speaker pitch angle. This movement can also be described as enabling the platform, and the speaker there upon to be rotated about the "X" axis. The motion 206 of the sway arm/intermediate arm joint is centered upon axis 207 shown in FIG. 5. Movement of sway arm/intermediate arm joint in combination with movement of the below-described intermediate arm/tertiary arm enables the position of a speaker mounted upon platform 3 to be adjusted in regard to height (or as it may also be described, movement upon and down the "Y" axis)—without necessarily changing the upward/downward inclination (rotation about the "X" axis) of the speaker mounted thereon. However, although adjustment of both the intermediate arm/tertiary arm joint in combination with the sway arm/intermediate arm enables adjustment of speaker height while enabling such adjustment to be accomplished without disturbing the upward/downward tilt of a speaker. However, such movement will alter the depth (or as it may also be described, fore/aft) position of the speaker relative the flat screen display (movement forward and rearward along the "Z" axis). For example, if one desires to increase the relative height of speaker 1 mounted upon platform 3 while keeping the broad top surface of the platform (and thus the speaker mounted thereupon) perpendicular to the display screen, the relative depth of the speaker (and platform will necessarily change during such adjustments). For example, adjustment of these two joints in view of obtaining the greatest speaker height, while keeping the top surface of the platform perpendicular to the display screen may cause the speaker position to move rearward, towards behind the flat screen display. In order to enable the device of the present invention to adjust speaker height relative to the display device without:

1. Changing the upward/downward tilt of the speaker (pitch); and

2. Without changing the fore/aft position (movement along the "Z" axis) of a speaker so adjusted, the sway arm/intermediate arm, intermediate arm/tertiary arm and the below described tertiary arm/platform arm must all be adjusted. Thus, the device of the present invention does enable the height of a speaker mounted to a flat screen display device thereby to be adjusted, without disturbing the position of the speaker so adjusted in regard to upward/downward tilt (pitch angle or rotation about the "X" axis), or the fore/aft position of the speaker (movement along the "Z" axis), relative to the flat screen display.

The intermediate arm 68 articulates, at the distal terminus 75 thereof, with the proximal terminus 79 of tertiary arm 80. Both the distal terminus of the intermediate arm and the proximal terminus of the tertiary arm are formed in the shape of curve having a radius of about 180 degrees. However, extending from an outer face, near the proximal terminus 79 of the tertiary arm, a disc portion 85 extends. The disc portion provides, as it does in regard to the disc portion 58 located at the distal terminus of sway arm 50, sufficient material thickness to enable the retention of extension springs and positioning balls housed therein. A retaining bolt bore 82 and 93 is formed in the center of both the distal portion of the intermediate arm and at the proximal curved section of the tertiary arm—at the radial axis thereof and is utilized, as discussed in more detail below, to receive retaining bolt 86 which, in conjunction with nut 88 enables the formation of a rotating (or as it may also be described, pivoting) tertiary arm/intermediate arm joint. As described above, the positioning groove is configured as a groove formed of circular depressions having substantially the same diameter as the positioning balls and having a depth less than one half the diameter of the positioning balls, discussed below. It is advantageous that the diameter of the holes comprising the groove should not be greater than the diameter of the positioning balls themselves so as to avoid excessive "play" which would result in an absence of precise seating of the balls within the groove. The positioning groove is formed and located upon the outer face of the distal end of the intermediate arm in such a manner so that, when the intermediate arm and tertiary arm are affixed together, as described immediately above—, positioning balls 88 located within ball retaining bores of the inner face of the tertiary arm are urged outward by the extension springs 92 so as to provide positive "click" positioning of the intermediate arm relative to the tertiary arm. Thus, the ring of circular depressions comprising the positioning groove acts to provide positive detents for accurate positioning. Articulation of the joint formed by the distal end of the intermediate arm and the proximal end of the tertiary arm provides enables a speaker mounted upon platform 3 to be adjusted in regard to upward and downward tilt (pitch or rotation about the "X" axis). The motion 210 provided by rotation of this joint about axis 211 is illustrated in FIG. 5. However, articulation of the sway arm/intermediate arm in combination with articulation of the intermediate arm/tertiary arm joint enables one to adjust the relative height of a speaker mounted upon the apparatus while either maintaining or changing the upward, downward tilt of the speaker as desired.

The distal portion 94 of the tertiary arm defines a curve having a radius of about 180 degrees. A retaining bolt bore 84 is located in the distal portion of the tertiary arm at the radial axis of said curve. The retaining bolt bore, when aligned with the retaining bolt bore 110 located at the proximal terminus 101 of the platform arm 100, allows retaining bolt 95 to pass through both bores, and threadingly engage nut 97 to form a tertiary arm/platform arm joint. A positioning groove is located, circumferentially about the retaining bolt bore 84 on the outer face 97 at the distal portion 94 of the tertiary arm.

The positioning groove is formed and located upon the outer face of the distal end of the tertiary arm in the same manner as discussed above in regard to the positioning groove formed near the distal portion of the intermediate arm. The groove functions in such a manner so that, when the tertiary arm and platform arm 100 are affixed together via bolt 95 and nut 97, as described immediately above—, positioning balls 108 located within ball retaining bores 106 formed upon and within the inner face of the proximal portion 101 of the platform arm are urged outward by the extension springs 107 so as to provide positive "click" (detent) positioning of the tertiary arm relative to the platform arm. Thus, a ring of circular depressions comprising the positioning groove, which is formed as described above in regard to the positioning groove located at the proximal terminus of the intermediate arm, acts to provide positive detents for accurate positioning of the tertiary arm/platform arm joint. Articulation of this joint, in the absence of articulation of the aforementioned joints, enables one to tilt a speak mounted upon platform 3 upward or downward (change the pitch or provide movement about the "X" axis). Rotation 208 of this joint and the axis of motion thereof 209 is illustrated in FIG. 5. However, movement of the tertiary arm/platform arm joint in conjunction with the tertiary arm/intermediate arm joint enables one to adjust the height of a speak mounted upon the speaker platform—without altering the upward downward tilt of the speaker—. However, such movement will also change the relative depth position of the speaker relative to the flat screen panel. This is to say, such double joint manipulation will, in addition to enabling movement of the speaker up and down (height adjustment which may also be described as movement up and down the "Y" axis) will also cause the speaker to move forward and backward relative to a plane formed by the flat panel display (movement along the "Z" axis). Articulation of the platform arm/tertiary arm and the tertiary arm/intermediate arm and the sway arm intermediate arm joint enables one to adjust the height of a speaker mounted upon the platform without (if desired) changing the relative depth or upward/downward tilt of the speaker.

Rotation of any of the aforementioned sway arm/intermediate arm, intermediate arm/tertiary arm or tertiary arm/platform arm joints can be described as rotation about the X axis. Such rotation changes the upward/downward cant of a speaker mounted upon the platform but, also, of course, will necessarily change the height and depth position of the speaker as well. In order to select just one parameter to be changed amongst these three positions, while maintaining the other two, all three joints must be manipulated The platform arm includes a tab extension 112 located at a distal portion thereof. The tab extension includes, a platform mounting bolt groove 115 formed therewithin for receipt of a platform mounting bolt 117. A bottom surface of speaker platform 3 advantageously includes a tab recess 119 having a length, width and depth enabling said tab extension to fit therewith. Upon alignment of the tab within the recess, a mounting bolt receiving bore 121 formed within the speaker platform enables platform mounting bolt 117 to affix the speaker platform to the platform arm. Platform mounting bolt 117 may be selected to demonstrate a length and configuration sufficient to engage the platform, extend through the superior planar surface 125 thereof and engage a bolt receiving bore prepared within the bottom surface of speaker 1. Alternatively, double sided tape, hook and loop fastening material, adhesive materials or putty may be utilized to affix the speaker to the superior planar surface of the platform.

The pivot arm, pivot bracket, sway arm, intermediate, tertiary and platform arm, as well as the speaker platform are advantageously constructed of a rigid and durable materials such as, for example, a metal material such as, for example, aluminum, an aluminum alloy or steel (and steel alloys). However, all of these components may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

The extension springs are advantageously fabricated from a high quality spring steel. As is well known to the art, spring steel is a low alloy, medium carbon steel used in springs because it has a higher elastic modulus compared to other steels. Silicon is a key component to most spring steel alloys.

It is also advantageous to fabricate the above-described positioning balls and lock pins from a steel or steel alloy material so as to achieve the strength and sheer resistance required from such components.

The present invention provides, in an alternate preferred embodiment thereof illustrated in FIG. 6, a speaker mounting apparatus especially configured and adapted for flat panel display devices which utilize a wall, ceiling or pedestal mount comprised of two vertical, box like channels which are affixed to the back of such devices utilizing VESA mounting holes. In such instances, the two vertical device mounting channels, which are often utilized to mount larger (display sizes greater than 23 inches measured diagonally) would make difficult the use of the first preferred embodiments, described above. More specifically, the first preferred embodiment of the present invention utilizes a receiving arm which is a one piece unit and which, by reason of such configuration, poses more difficulties in regard to interference with the aforementioned panel mounts utilizing vertical channel mounts. Such vertical channels pose as obstruction and would, in certain instances, block placement of the receiving arm unless, for example, an elongated vertical section of the "F" brackets was utilized to place the horizontal receiving arm well under the inferior extent of the vertical channel mounts. Therefore, the alternate preferred embodiment of the present invention utilizes two separate compact receiving arms 146 & 146' instead of a single receiving arm. As shown in FIG. 6 the alternate preferred embodiment utilizes to flat L-shaped mounting arms 132 & 132' which each include 2 panel bolt receiving slots 134, 134', 136 and 136' as a means of affixing the apparatus to the back of flat panel display device 138. The flat L-shaped mounting arms are especially formed and configured so that the aforementioned receiving slots will align with the standardized VESA bolt receiving plates, and the threaded bolt receiving bores formed therein, located on the majority of such devices. The two L-shaped brackets and the flat configuration thereof, in combination with the use of two separate receiving arms, enable the speaker mounting apparatus of the alternate preferred embodiment of the present invention to be mounted underneath or external to vertical channel mounting devices utilized to mount such display devices to walls, ceilings or, in some instances, at part of pedestal mounts.

Each of the L-shaped arms includes, at an inferior terminus 140 thereof, a receiving arm mounting tab 142. Each such, in turn, includes a mounting bolt bore. A receiving arm 146, shaped as a hollow, square or rectangular channel, also includes, near the proximal terminus thereof, a disc-like mounting ring 147 which includes, at its radial axis, a bolt receiving bore 144. The mounting bolt bores located near the inferior terminus of the L-shaped mounting arms and the proximal end of the receiving arms are especially configured and formed so as to allow them to align, one with the other and to enable placement of a nut and bolt therethrough so as to form an "L" shaped mounting arm/receiving arm joint. This joint enables inward and outward tilting of a speaker 1 mounted upon platform (which may also be described a rotation about the "Z" axis). The axis is located however coaxially with receiving bore 144 so rotation occurs about this axis allowing the speaker to rise and fall in an arc with an axis aligned with the bolt which is threaded through bore 144.

An extension arm 150 is also formed as a hollow rectangular channel but of such a dimension so as to allow the extension arm to fit coaxially about each of the receiving arms 146 so as to allow the extension arm to slide inwards (towards the display, and outwards, away from the display thereby allowing selection of desired speaker separation of speakers mounted upon platforms 3.

As described above in regard to the first preferred embodiment, a pivot arm 28 is especially configured and adapted for affixation to the distal portion of the extension arm. The pivot arm is affixed to a pivot bracket 40 and the joint formed therebetween enables the same platform/speaker positioning and movement as discussed above in regard to the first preferred embodiment.

The pivot bracket is, in turn, affixed to a sway arm 50 in the same manner as discussed above and forms an identical pivot arm/sway arm joint which, in turn provides the same speaker/platform positioning functions as it does in regard to the first preferred embodiment.

The sway arm is, in turn, affixed to the intermediate arm 68 in the same manner as discussed above and forms an identical sway arm/pivot arm joint which, in turn provides the same speaker/platform positioning functions as it does in regard to the first preferred embodiment.

The intermediate arm is, in turn, affixed to the tertiary arm 80 in the same manner as discussed above and forms an identical intermediate arm/tertiary arm joint which, in turn provides the same speaker/platform positioning functions as it does in regard to the first preferred embodiment.

The tertiary arm is, in turn, affixed to the platform arm 100 in the same manner as discussed above and forms an identical tertiary arm/platform arm joint which, in turn provides the same speaker/platform positioning functions as it does in regard to the first preferred embodiment.

Although the alternate preferred embodiment of the present invention provides the same full range of speaker positioning as does the first preferred embodiment, it enable mounting of the device in situations where vertical channel mounts utilized to mount a flat panel device would obviate use of the first preferred embodiment of the present invention.

It is also contemplated that, in addition to speakers, the device may be adapted to include platforms (other than speaker platforms) especially shaped and configured to enable the mounting of other devices and objects (in addition to speakers). Such platforms are affixed to a platform arm in the same manner and in the same functional relation as the speaker platform (discussed above). The shape of such platforms is such as to facilitate mounting of the below described peripheral devices and documents. In certain instances, the speaker mounting platform described above is also suitable for mounting objects that would, by virtue of their size and shape, be easily mounted thereupon. In other instances, the mounting platform is simply shaped to accurately receive and hold such objects. For example, the device of the present invention may be configured to include a platform(s) especially configured to hold web cameras, microphones, cell phones and camcorders. Also, the device may include a platform utilized to hold media players and recorders, such as, for example, mp3 players, ipods, pocket PC devices, multimedia car readers, computer pointing devices (e.g. mouse), document holders, external drives (e.g. disc drives including hard and removable media drives), computer modems and digital picture displays.

The terms and expressions which have been employed in the foregoing specification are used therein as terms of description and not limitation, and there is no intention, in the use of such terms and expressions, of excluding equivalents of the features shown and described or portions thereof, it being recognized that the scope of the invention is defined and limited only by the following claims.

I claim:

1. A speaker mounting device especially configured and adapted for mounting at least two speakers to a flat panel display device wherein said device comprises at least one mounting bracket especially configured and adapted to align with and enable engagement of said bracket with standardized threaded receiving holes located within a mounting plate incorporated in a back surface of a flat panel display device,
at least one receiving arm
two extension arms,
two pivot arms,
two pivot brackets,
two sway arms,
two intermediate arms,
two tertiary arms,
two platform arms and
two speaker mounting platforms and wherein said mounting device enables adjustment of position of each of the at least two speakers mounted to a flat panel display device thereby in regard to six different speaker position parameters comprising height, separation, depth, upward/downward tilt, inboard/outboard tilt and right/left cant wherein, adjustment of any one of the foregoing position parameters may be accomplished independently without altering the remaining position parameters.

2. The speaker mounting device of claim 1 wherein the at least one mounting bracket is an F-shaped bracket.

3. The speaker mounting device of claim 2 wherein the F-shaped bracket includes two horizontal receiving arms especially configured and adapted for capturing and retaining the receiving arm therebetween.

4. The speaker mounting device of claim 1 wherein the at least one mounting bracket is configured as an L-shaped bracket.

5. The speaker mounting device of claim 4 wherein a receiving arm mounting tab is located at an inferior terminus of the L-shaped bracket, said mounting tab including a mounting bolt bore therein especially configured and adapted to enable pivotal affixation of an extension arm to the L-shaped bracket.

6. The speaker mounting device of claim 1 wherein the at least one mounting bracket, at least one receiving arm, two extension arms, two pivot arms, two pivot brackets, two sway arms, two intermediate arms, two tertiary arms, two platform arms and speaker mounting platforms are fabricated from a metallic material.

7. The speaker mounting device of claim 6 wherein said metallic material is selected from the group consisting of steel, steel alloy, aluminum and aluminum alloy materials.

8. The speaker mounting device of claim 1 wherein the at least one mounting bracket, at least one receiving arm, two extension arms, two pivot arms, two pivot brackets, two sway arms, two intermediate arms, two tertiary arms, two platform arms and two speaker platforms are fabricated from a plastic material.

9. The speaker mounting device of claim 8 wherein the plastic material is selected from the group consisting of polycarbonate, polyester, polyvinyl and polyacrylate plastic materials.

10. The speaker mounting device of claim 1 wherein the at least one mounting bracket, at least one receiving arm, two extension arms, two pivot arms, two pivot brackets, two sway arms, two intermediate arms, two tertiary arms, two platform arms and two speaker platforms are fabricated from a reinforced plastic material.

11. The speaker mounting device of claim 10 wherein the reinforced plastic material is selected from the group consisting of composite plastic, fiberglass and graphite filled resin materials.

12. A speaker mounting device especially configured and adapted for mounting at least two speakers to a flat panel display device wherein said device comprises two mounting brackets especially configured and adapted to align with and enable engagement of said bracket with standardized threaded receiving holes located within a mounting plate incorporated in a back surface of a flat panel display device;

at least one receiving arm;

two extension arms;

two pivot arms;

two pivot brackets;

two sway arms;

two intermediate arms;

two tertiary arms;

two platform arms; and two mounting platforms and wherein said mounting device enables independent adjustment of position of each of the at least two speakers mounted to a flat panel display device thereby in regard to six different speaker position parameters wherein said position parameters comprise height, separation, depth, upward/downward tilt, inboard/outboard tilt and right/left cant.

13. The speaker mounting device of claim 12 wherein the mounting platforms are especially configured, shaped and adapted for mounting peripheral devices to the flat screen display device.

14. The speaker mounting device of claim 13 wherein said peripheral devices are selected from the group consisting of web cameras, microphones, cell phones and camcorders.

15. The speaker mounting device of claim 13 wherein said peripheral devices are selected from the group consisting of mp3 players, pocket PC devices, multimedia card readers, computer pointing devices, modems and computer memory storage devices.

16. The speaker mounting device of claim 13 wherein said mounting platforms are especially configured and adapted for mounting digital picture displays.

17. The speaker mounting device of claim 13 wherein said mounting platform is especially configured and adapted for holding documents.

* * * * *